United States Patent Office 3,288,836
Patented Nov. 29, 1966

3,288,836
BENZOIC ACID ESTERS
George B. Sterling, Mogadore, Ohio, and Chester E. Pawloski, Bay City, Mich., assignors to The Dow Chemical Company, Midland, Mich., a corporation of Delaware
No Drawing. Filed Dec. 26, 1963, Ser. No. 333,638
6 Claims. (Cl. 260—473)

The present invention is directed to halo-2-(2-propynyloxy)benzyl esters of halo-2-(2-propynyloxy)benzoic acids and a method for their preparation. The novel compounds of the present invention correspond to the formula

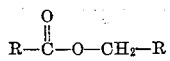

In this and succeeding formulae, R represents 2-(2-propynyloxy) - halophenyl or 2 - (2 - propynyloxy) - dihalophenyl. These compounds are liquid or solid materials that are somewhat soluble in many common organic solvents and of low solubility in water. The compounds have been found to be useful as pesticides for the control of various plant, insect, worm, bacterial and fungal organisms such as corn, Staphylococcus aureus, blight and mites.

The compounds of the present invention are prepared by reacting a propargyl halide with a compound having the formula

wherein $R_1$ represents 2-hydroxy-halophenyl or 2-hydroxydihalophenyl. The reaction is carried out in the presence of a weak alkali metal base with the production of the desired product and halide of reaction. The alkali metal cation of the employed base combines with the halide so that the halide appears in the reaction mixture as metal halide. It is preferable that the reaction be carried out in an organic solvent as reaction medium. Representative solvents include acetone and acetone-benzene.

The reaction will proceed at any temperature at which the halide of reaction is produced. However, it is preferred, that the reaction be carried out at a temperature between 0 and 100° C. The length of time which the reaction mixture must be maintained at the reaction temperature is inversely proportional to the temperature, i.e., increasing the temperature at which the reaction is carried out will decrease the reaction period. Therefore, temperatures between 40 and 100° C. will give the most efficient production of the desired product.

The propargyl halide, alkali metal base and the substituted salicylaldehyde can be reacted in any molecular proportions with production of some of the desired product. However, for every mole of salicylaldehyde employed, the reaction consumes equimolar amounts of each of the propargyl halide and basic material. For optimum yields it is preferred that the reactants be employed in equimolar amounts or amounts of propargyl halide and basic material slightly in excess of equimolar proportions.

In carrying out the reaction, the salicylaldehyde, propargyl halide, such as the chloride or bromide and the basic material such as an alkali metal carbonate, can be combined in any desired order and fashion. However, it is preferred that the reactants be dispersed, in any order, in an organic liquid reaction medium. The reaction mixture is maintained at the reaction temperature for a period of time. It is preferable, to maintain the reaction at a temperature in the reaction temperature range, at least until there is a substantial cessation in the evolution of the halide of reaction. The reaction mixture is then combined with an aqueous solution of alkali metal hydroxide and the mixture reheated for a short time. The alkali metal hydroxide converts any unreacted starting materials to water soluble salts, thus facilitating the purification of the product. Following the second heating period the reaction mixture is diluted with water and the organic layer which separates during the dilution procedure is collected by conventional procedures. The product containing organic layer is then heated to remove the low boiling constituents and obtain the product as a residue.

EXAMPLE 1

5-bromo-2-(2-propynyloxy)benzyl 5-bromo-2-(2-propynyloxy)benzoate

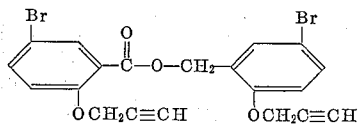

5-bromo-2-hydroxybenzaldehyde (100 grams), propargyl bromide (70 grams), and potassium carbonate (75 grams) were dispersed in 300 milliliters of acetone. The resulting mixture was heated with stirring at the boiling temperature and under reflux for thirty-two hours. Following this heating period, the reaction mixture was combined with 60 milliliters of water containing 20 grams of sodium hydroxide and the resulting mixture reheated for a short period. The reaction mixture was then diluted with water and the organic layer which separated during the dilution was collected. This organic layer was heated to remove the low boiling constituents and obtain the 5-bromo-2-(2-propynyloxy)benzyl 5-bromo-2-(2-propynyloxy)benzoate product as a liquid residue having a refractive index n/D of 1.5827 at 25° C. Upon standing, the liquid product solidified. The product in the solid state melted at 65° to 67° C.

EXAMPLE 2

5-chloro-2-(2-propynyloxy)benzyl 5-chloro-2-(2-propynyloxy)benzoate 5-chloro-2-hydroxybenzaldehyde (100 grams), propargyl bromide (90 grams) and potassium carbonate (100 grams) were dispersed in 500 milliliters of acetone and the resulting mixture heated as described in Example 1 for twenty-four hours. The reaction mixture was then combined with 90 milliliters of an aqueous solution of 33 percent sodium hydroxide and reheated for a short period. Following this period, the reaction mixture was processed exactly as described in Example 1 to obtain the 5 - chloro-2-(2-propynyloxy)benzyl 5-chloro-2-(2-propynyloxy)benzoate product as thick yellow residue (refractive index n/D of 1.5825 at 25° C.) which solidified and melted at 75–77° C.

EXAMPLE 3

3,5 - dibromo - 2 - (2-propynyloxy)benzyl 3,5-dibromo-2-(2-propynyloxy)benzoate

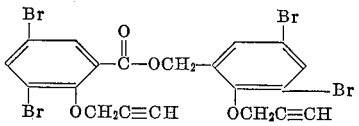

3,5-dibromo-2-hydroxybenzaldehyde (50 grams), propargyl bromide (25 grams), and potassium carbonate (28 grams) were dispersed in 300 milliliters of acetone and heated, as described in Example 1, for twenty-four hours. Following this heating period 30 milliliters of aqueous 33 percent sodium hydroxide solution was added to the reaction mixture and the mixture heated for a short period. The liquid 3,5-dibromo-2-(2-propynyloxy)benzyl 3,5-dibromo-2-(2-propynyloxy)benzoate product, refractive index n/D of 1.5982 at 25° C., was obtained exactly as described in Example 1.

EXAMPLE 4

*3,5-dichloro-2-(2-propynyloxy)benzyl 3,5-dichloro-2-(2-propynyloxy)benzoate*

3,5-dichloro-2-hydroxybenzaldehyde (50 grams), propargyl bromide (35 grams) and potassium carbonate (40 grams) were dispersed in 300 milliliters and heated, as described in Example 1 for twenty-four hours. The reaction mixture was then processed exactly as described in Example 1 to obtain the 3,5-dichloro-2-(2-propynyloxy)benzyl 3,5-dichloro-2-(2-propynyloxy)benzoate product as a solid product having a melting point of 67° to 69° C.

The following compounds of the present invention can be prepared in a similar manner.

3,4-dibromo-2-(2-propynyloxy)benzyl 3,4 - dibromo-2-(2-propynyloxy)benzoate (molecular weight 637.9) by reacting together 3,4 - dibromo - 2-hydroxybenzaldehyde, sodium carbonate and propargyl chloride.

4 - chloro - 2-(2-propynyloxy)benzyl 4-chloro-2-(2-propynyloxy)benzoate (molecular weight 389.2) by reacting together 4-chloro-2-hydroxybenzaldehyde, potassium carbonate and propargyl bromide.

6-chloro-2-(2-propynyloxy)benzyl 6-chloro - 2 - (propynyloxy)benzoate (molecular weight 389.2) by reacting together 6-chloro-2-hydroxybenzaldehyde, propargyl chloride and sodiom carbonate.

5,6 - dibromo - 2-(2-propynyloxy)benzyl 5,6-dichloro-2-(propynyloxy)benzoate (molecular weight 637.9) by reacting together 5,6-dibromo-2-hydroxybenzaldehyde, propargyl bromide and potassium carbonate.

4,6 - dichloro - 2-(2-propynyloxy)benzyl 4,6-dichloro-2-(2-propynyloxy)benzoate (molecular weight 460.1) by reacting together 4,6 - dichloro - 2-hyrdoxybenzaldehyde, propargyl bromide and sodium carbonate.

3,6 - dibromo - 2 - (2-propynyloxy)benzyl 3,6-dibromo-2-(2-propynyloxy)benzoate (molecular weight 637.9) by reacting together 3,6 - dichloro - 2-hydroxybenzaldehyde, propargyl chloride and potassium carbonate.

The new compounds of the present invention are useful as herbicides and parasiticides for the control of a number of plant, insect, worm, bacterial, and fungal organisms. For such uses, the unmodified compound can be used. The product can also be dispersed on a finely divided solid and employed as a dust. Such mixtures can be dispersed in water with or without the aid of a surface active dispersing agent, and the resulting aqueous suspensions employed as sprays, drenches or washes. In other procedures, the products of this invention can be employed as the toxic constituent in solvent solutions, oil-in-water or water-in-oil emulsions or aqueous dispersions. In representative operations, nutrient compositions containing 5-chloro-2-(2-propynyloxy)benzyl 5-chloro-2-(2-propynyloxy)benzoate at concentrations of 500 parts per million by weight, give substantially complete inhibition and control of *Staphylococcus aureus*. In other operations, aqueous dispersions containing 4 parts per million by weight of 3,5-dibromo-2-(2-propynyloxy)benzyl 3,5-dibromo - 2 - (2 - propynyloxy)benzoate give substantially complete kills of corn.

The various mono- and dihalosalicylaldehyde starting materials employed in the present invention can be prepared by known methods. The halogenation is accomplished by reacting salicylaldehyde and chlorine or bromine in the presence of iron as a catalyst and in the presence of an organic solvent such as carbon tetrachloride. It is also possible to carry out the halogenation by using ferric chloride, ferric bromide, aluminum chloride and aluminum bromide in the place of the halogen and iron. Upon completion of the reaction, the reaction mixture is fractionally distilled under reduced pressure to separate the various isomers formed during the reaction.

We claim:

1. The compound corresponding to the formula

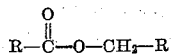

wherein R represents a member selected from the group consisting of 2 - (2 - propynyloxy) - halophenyl and 2-(2-propynyloxy)-dihalophenyl.

2. The method for the manufacture of a compound corresponding to the formula

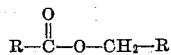

wherein R represents a member selected from the group consisting of 2 - (2 - propynyloxy) - halophenyl and 2-(2-propynyloxy)-dihalophenyl, which comprises reacting together an alkali metal carbonate, propargyl halide and a substituted benzaldehyde selected from the group consisting of 2-hydroxy-halobenzaldehyde or 2-hydroxy-dihalobenzaldehyde, the reaction being carried out at a temperature at which halide is formed.

3. 5 - bromo - 2 - (2 - propynyloxy)benzyl-5-bromo-2-(2-propynyloxy)benzoate.

4. 5 - chloro - 2 - (2 - propynyloxy)benzyl 5-chloro-2-(2-propynyloxy)benzoate.

5. 3,5 - dibromo - 2 - (2 - propynyloxy)benzyl 3,5-dibromo-2-(2-propynyloxy)benzoate.

6. 3,5 - dichloro - 2 - (2 - propynyloxy)benzyl 3,5-dichloro-2-(2-propynyloxy)benzoate.

References Cited by the Examiner
UNITED STATES PATENTS 3,097,230   7/1963   Miller _____ 260—473

OTHER REFERENCES

Fieser: "Organic Chemistry," p. 212 (1950).
Migrdichian: "Organic Synthesis" (1957), vol. II, p. 1283.

LORRAINE A. WEINBERGER, *Primary Examiner.*

S. B. WILLIAMS, *Assistant Examiner.*